(12) United States Patent  
Ono (10) Patent No.: US 7,237,923 B2  
(45) Date of Patent: Jul. 3, 2007

(54) BACKLIGHT UNIT HAVING A COOLING MEMBER

(75) Inventor: Shin-Ichirou Ono, Kanagawa (JP)

(73) Assignee: NEC LCD Technologies, Ltd. (JP)

( * ) Notice: Subject to any disclaimer, the term of this patent is extended or adjusted under 35 U.S.C. 154(b) by 36 days.

(21) Appl. No.: 11/110,049

(22) Filed: Apr. 19, 2005

(65) Prior Publication Data

US 2005/0237752 A1 Oct. 27, 2005

(30) Foreign Application Priority Data

Apr. 22, 2004 (JP) .............. 2004-127075

(51) Int. Cl.  
*F21V 29/00* (2006.01)

(52) U.S. Cl. .............. 362/218; 362/29; 362/373

(58) Field of Classification Search .............. 362/29, 362/30, 96, 218, 225, 260, 294, 373  
See application file for complete search history.

(56) References Cited

U.S. PATENT DOCUMENTS 5,174,646 A * 12/1992 Siminovitch et al. ....... 362/294

5,791,770 A * 8/1998 Hoyt et al. .................. 362/218  
6,979,102 B2 * 12/2005 You ............................ 362/218  
2004/0076006 A1 * 4/2004 Mai ............................ 362/29

FOREIGN PATENT DOCUMENTS

| JP | 08-029785 | 2/1996 |
|---|---|---|
| JP | 2000-338483 | 12/2000 |
| JP | 2002-196326 | 7/2002 |
| JP | 2003-084280 | 3/2003 |

* cited by examiner

*Primary Examiner*—Y. My Quach-Lee  
(74) *Attorney, Agent, or Firm*—Hayes Soloway P.C.

(57) ABSTRACT

A backlight unit includes a lamp housing, a plurality of elongate lamps received therein, and a cooling member having a heat-absorbing part and a heat-radiating part. The heat-absorbing part includes a plurality elongate heat-absorbing portions having a light reflecting function and arranged alternately with the elongate lamps. The heat-radiating part extends from the elongate heat-absorbing portions of the heat-absorbing part and is disposed outside the lamp housing. The cooling member has a heat-radiation function as well as a luminescence assistance function.

22 Claims, 13 Drawing Sheets

BACKLIGHT UNIT HAVING A COOLING MEMBER

BACKGROUND OF THE INVENTION

1. Field of the Invention

The present invention relates to a backlight unit of direct emission type in which light sources are arranged at the rear side of the light emitting surface of the backlight unit. The present invention also relates to a LCD device including such a backlight unit.

2. Description of the Related Art

Backlight units are known in the art as planar light-emitting devices. The backlight units are generally classified into two types. The first type is a direct emission unit, in which a plurality of light sources (i.e., lamps) are arranged at the rear side of the light-emitting surface of the backlight unit. The second type is an edge-light emission unit, in which the light emitted by the light sources is guided toward the light-emitting surface by an optical guide plate. The direct emission unit has a larger light-emitting surface and thus can attain a higher luminance, compared to the backlight unit of the edge-light emission type. Having these advantages, the direct emission unit is suitable for use in, particularly, a large-screen LCD device.

Figure 15:
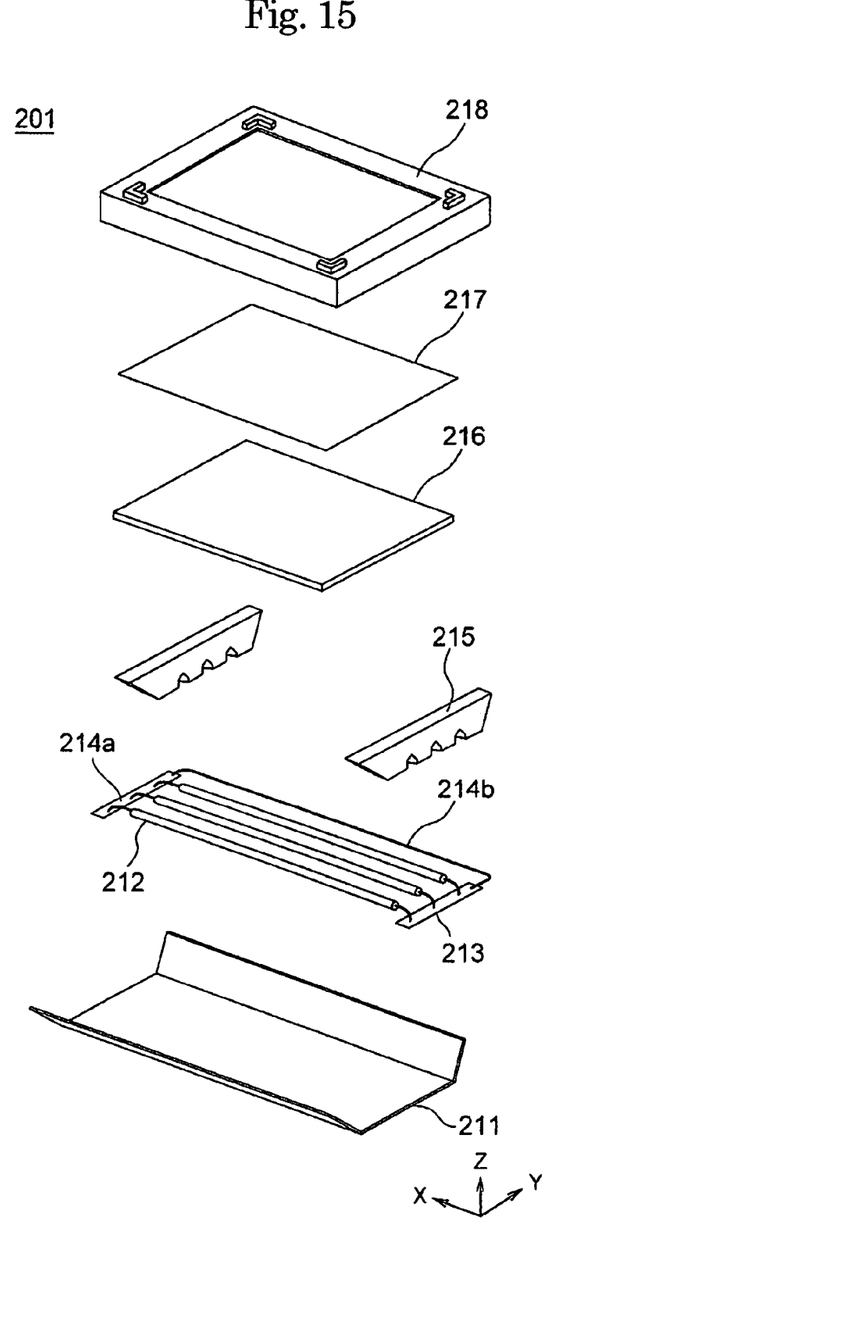
FIG. 15 is an exploded perspective view illustrating the structure of a conventional backlight unit.

FIG. 15 is an exploded perspective view illustrating the structure of a conventional backlight unit of the direct emission type. As shown in the drawing, the backlight unit 201 includes therein a reflecting plate 211, a plurality of lamps 212, a lamp-supporting base 215, a diffusion plate 216, an optical sheet 217, and a backlight chassis 218. The lamps 212 are connected at one end to an inverter 213, and at the other end to a return substrate 214a. A ground potential is applied to the return substrate 214a through a return cable 214b. Part of the light emitted from the lamps 212 is directly irradiated onto the diffusion plate 216, and other part of the light is reflected by the reflecting plate 211 and then irradiated onto the diffusion plate 216. The outer surface of the diffusion plate 216 generally defines the light-emitting surface of the backlight unit 201.

Figure 16:
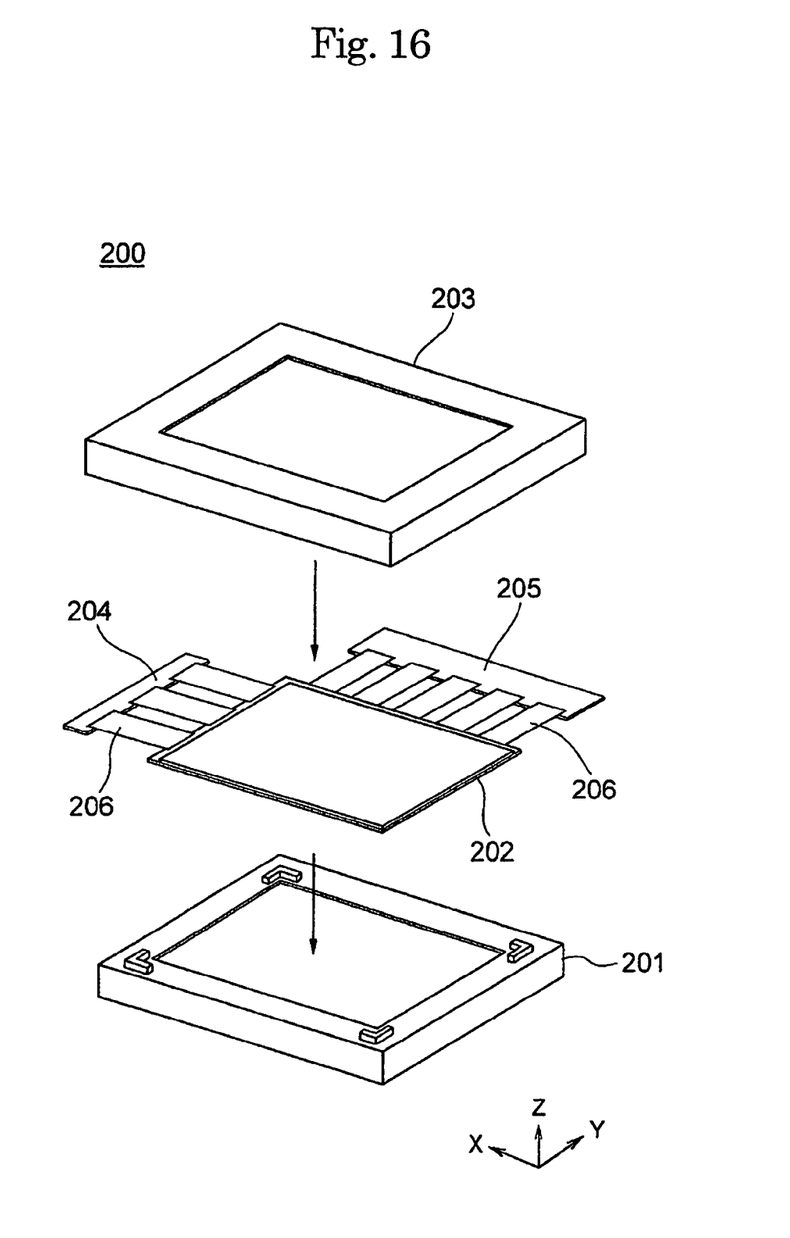
FIG. 16 is an exploded perspective view depicting a LCD device of ordinary type.

FIG. 16 is an exploded perspective view depicting a LCD device 200 that includes the backlight unit 201. In the LCD device, a liquid crystal panel 202 is connected to an X-direction drive circuit 204 and a Y-direction drive circuit 205 by respective TCPs (Tape Carrier Packages) 206. The panel 202 is clamped and held between a shield front frame 203 and the backlight unit 201. The liquid crystal panel 202 is mounted on the light-emitting surface of the backlight unit 201, or more precisely, on the optical sheet 217 thereof. The panel 202 controls the transmission of the backlight emitted by the backlight unit 210, to thereby display desired images.

In the backlight unit 201, the lamps 212 are interposed between the reflecting plate 211 and the diffusion plate 216. Therefore, the heat generated by the lamps 212 is hardly radiated outside. The heat generated by the lamps 212 heats the diffusion plate 216. Mounted on the diffusion plate 216, the liquid crystal panel 202 is heated by the heat it receives from outside, and also by the heat radiated from the diffusion plate 216. Consequently, in the LCD device 200, the liquid crystal panel 202 may be heated up to an undesired temperature, particularly in a higher-temperature ambient, and may fail to display images of desired quality. In other words, the LCD device 200 may have its rated operating temperature lowered by the backlight unit.

As in most cases, the lamps 212 exhibit a temperature characteristic. That is, the luminescence efficiency of the lamps 212 increases as the temperature rises, reaches a peak efficiency at a specific temperature, and decreases as the temperature falls from the specific temperature. Thus, in the backlight unit 201, there is a problem in that the lamps 212 have a reduced luminescence efficiency when their operating temperature rises above the specific temperature, due to the heat they generate. The backlight unit 201 has another problem in that when the lamps 212 are used at high temperatures, the lamps are degraded due to heat and thus the lifetime of the lamps 212 is reduced. As described heretofore, the backlight unit 201 has problems due to the heat that the lamps 212 itself radiate.

Figure 17:
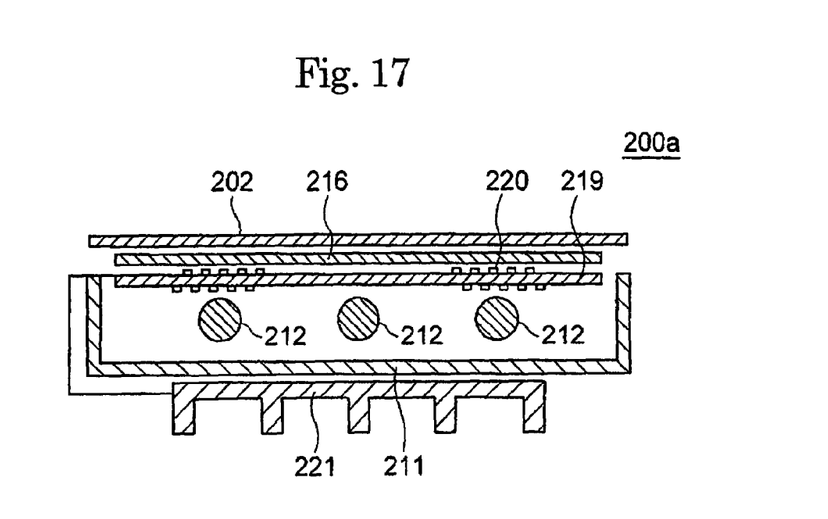
FIG. 17 is a sectional view showing the conventional backlight unit described in Jpn. Pat Appln. Laid-Open Publication No. 8-29785.

Various techniques of radiating the heat generated by the lamps 212 of the backlight unit are described in, for example, Jpn. Pat. Appln. Publication Nos. 2002-196326, 2003-84280, and 8 (1996)-29785. The technique described in Pat. Publication No. 2002-196326 is to radiate the heat of the lamps 212 through the ventilation holes that are formed in the reflecting plate 211 disposed at the rear side of the lamps 212. The technique described in Publication No. 2003-84280 is to radiate the heat of the lamps 212 from the reflecting plate 211, via a heat-radiating body that contacts the lamps 212 with the reflecting plate 211. The technique described in Publication No. 8-29785 is to provide a transparent substrate 220 with a stripe member 219 having a comparatively higher thermal conductivity, between the diffusion plate 216 and the lamps 212 as shown in FIG. 17, and to radiate the heat absorbed in the transparent substrate 220 through a heat-radiating member 221.

Figure 18:
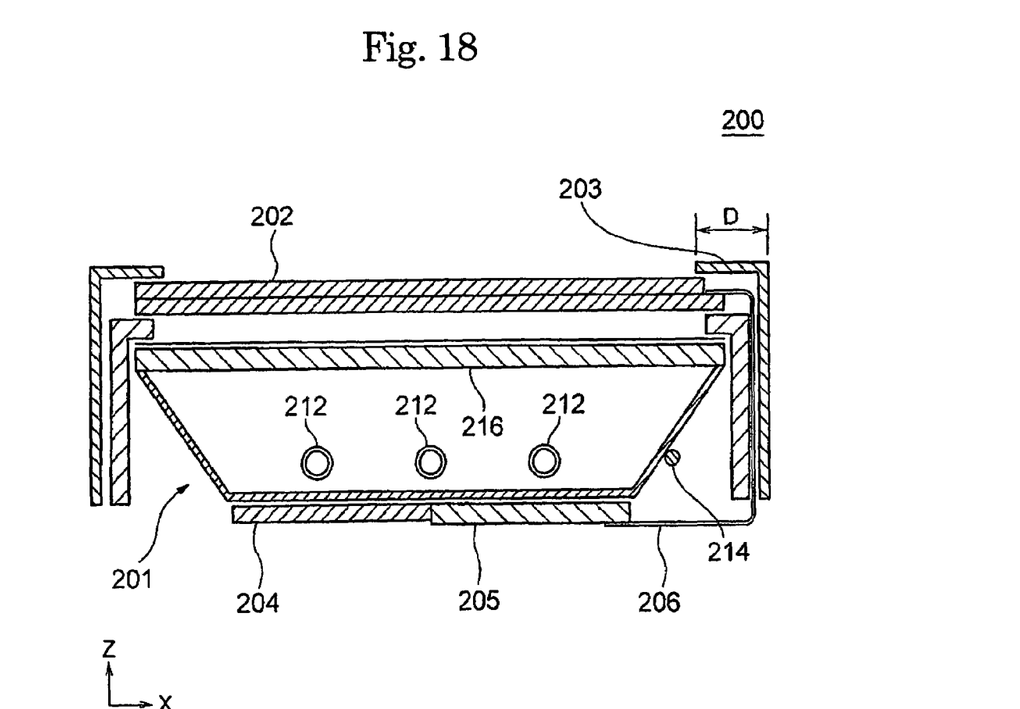
FIG. 18 is a sectional view showing the structure of the LCD device shown in FIG. 16.

FIG. 18 is a sectional view taken parallel to the Y-Z plane in FIG. 16, and illustrates the LCD device 200 being assembled. It is desired in the LCD device 200 that the width (width D, in FIG. 18) of frame of the LCD device be reduced so that the LCD device 200 may become smaller without reducing the effective display area. To this end, the TCPs 206 are bent in the LCD device 200 to dispose the X-direction drive circuit 204 and the Y-direction drive circuit 205 on the rear side of the backlight unit 201 in the vicinity of the reflecting plate 211 of the backlight unit 201. In this configuration, however, if the heat is radiated from the reflecting plate 211 as is the case described in Publications Nos. 2002-196326 and 2003-84280, the X-direction drive circuit 204 and the Y-direction drive circuit 205 will be heated, thereby reducing the reliability of the drive circuits 204 and 205. If a transparent substrate having a stripe member is provided between the diffusion plate 216 and the lamps 212, as is the case described in Publication No. 8-29785, the luminance at the light-emitting surface will be reduced.

Figure 19:
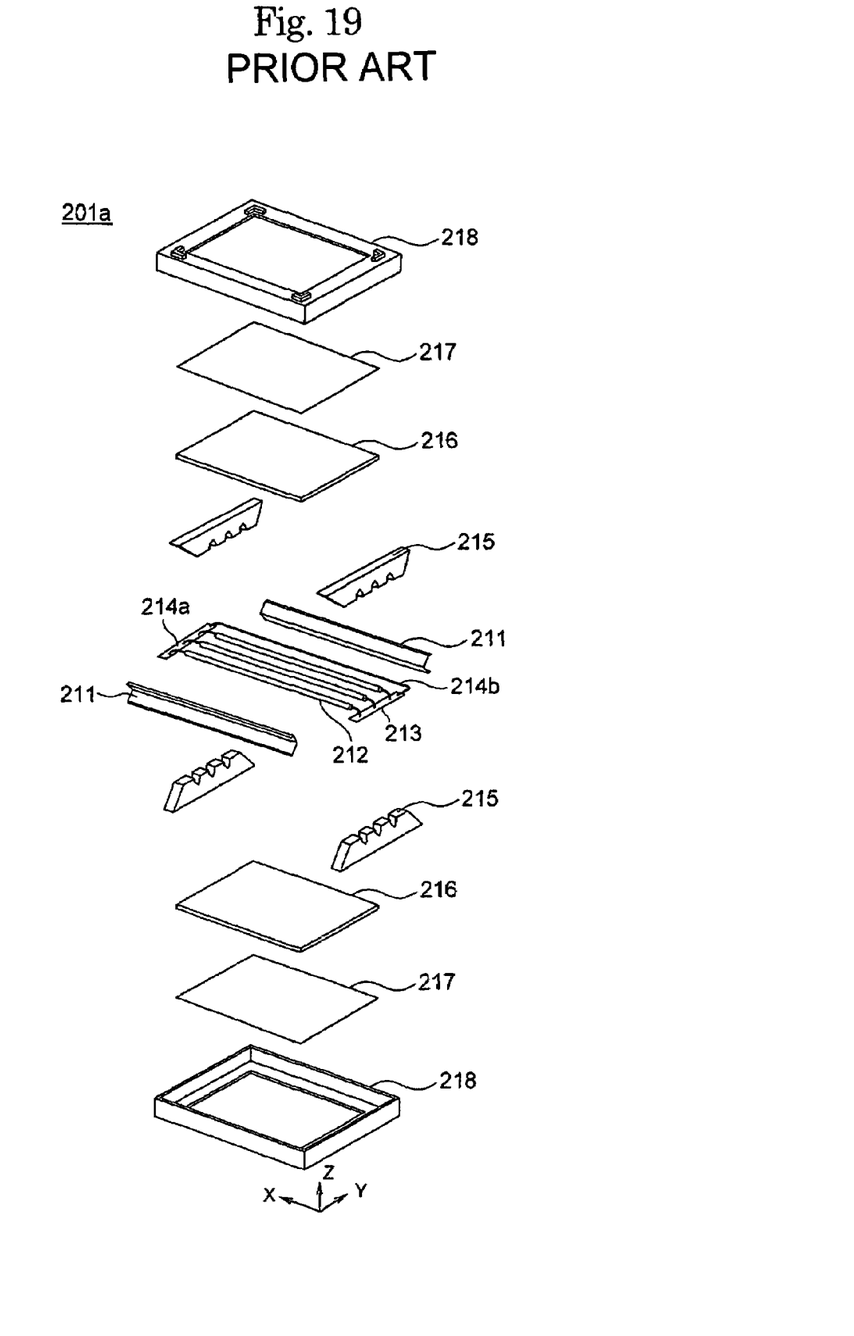
FIG. 19 is an exploded perspective view of a conventional double-surface backlight unit.

Another type of the backlight unit is also known. This type is called double-surface backlight unit, which has another light-emitting surface at the rear side thereof, in addition to the light-emitting surface on the front side. A double-surface backlight unit is described in, for example, Jpn. Pat. Appln. Publication No. 2000-338483. FIG. 19 is an exploded perspective view of the double-surface backlight unit 201a described therein. The double-surface backlight unit 201a includes a front part and a rear part, which are symmetrical with respect to the lamps 212. Each of the front and rear parts has a lamp-supporting base 215, a diffusion plate 216, an optical sheet 217, and a backlight chassis 218. The double-surface backlight unit 201a has no component that corresponds to the reflecting plate 211 (FIG. 15) that is opposed to the diffusion plate 216. The lamps 212, which are arranged in a row, emit light through both the light-emitting surfaces.

In the double-surface backlight unit 201a, the heat generated from the lamps 212 involves a problem as in the case of the single-surface backlight unit 201. Having no reflecting plate 211 at the rear side of the lamps 212, the double-surface backlight unit 201a cannot adopt a structure that radiates heat from the rear side, differently from the backlight units described in Publications Nos. 2002-196326 and 2003-84280. If the double-surface backlight unit 201a has a transparent substrate 220 provided between the diffusion plate 216 and the lamps 212 as is the case described in Publication No. 8-29785, the luminescence efficiency at the light-emitting surfaces will decrease similarly to the single-side backlight unit 210 described above.

SUMMARY OF THE INVENTION

In view of the problems in the conventional backlight units as described above, it is an object of the present invention to provide a backlight unit that solves the problems in the conventional backlight units. More specifically, it is an object of the present invention to provide a backlight unit that can radiate the heat generated from the light source while preventing the luminescence efficiency at the light-emitting surface from being degraded, even though the heat is not radiated from the rear side of the backlight unit.

The present invention provides a backlight unit including: a lamp housing having a light transmittance plate at a front surface of the lamp housing: at least one lamp received in the lamp housing for emitting light through the light transmittance plate toward outside the lamp housing: a cooling member having a heat-absorbing part received in the lamp housing and a heat-radiating part extending from the heat-absorbing part to outside the lamp housing for radiating heat absorbed by the heat-absorbing part to outside the lamp housing.

In accordance with the backlight unit of the present invention, the cooling member radiates the heat generated by the lamp to improve the luminescence efficiency of the backlight unit without using the rear side of the backlight unit.

The above and other objects, features and advantages of the present invention will be more apparent from the following description, referring to the accompanying drawings

DETAILED DESCRIPTION OF THE PREFERRED EMBODIMENTS

Embodiments of the present invention will be now described in detail, with reference to the accompanying drawing.

Figure 1:
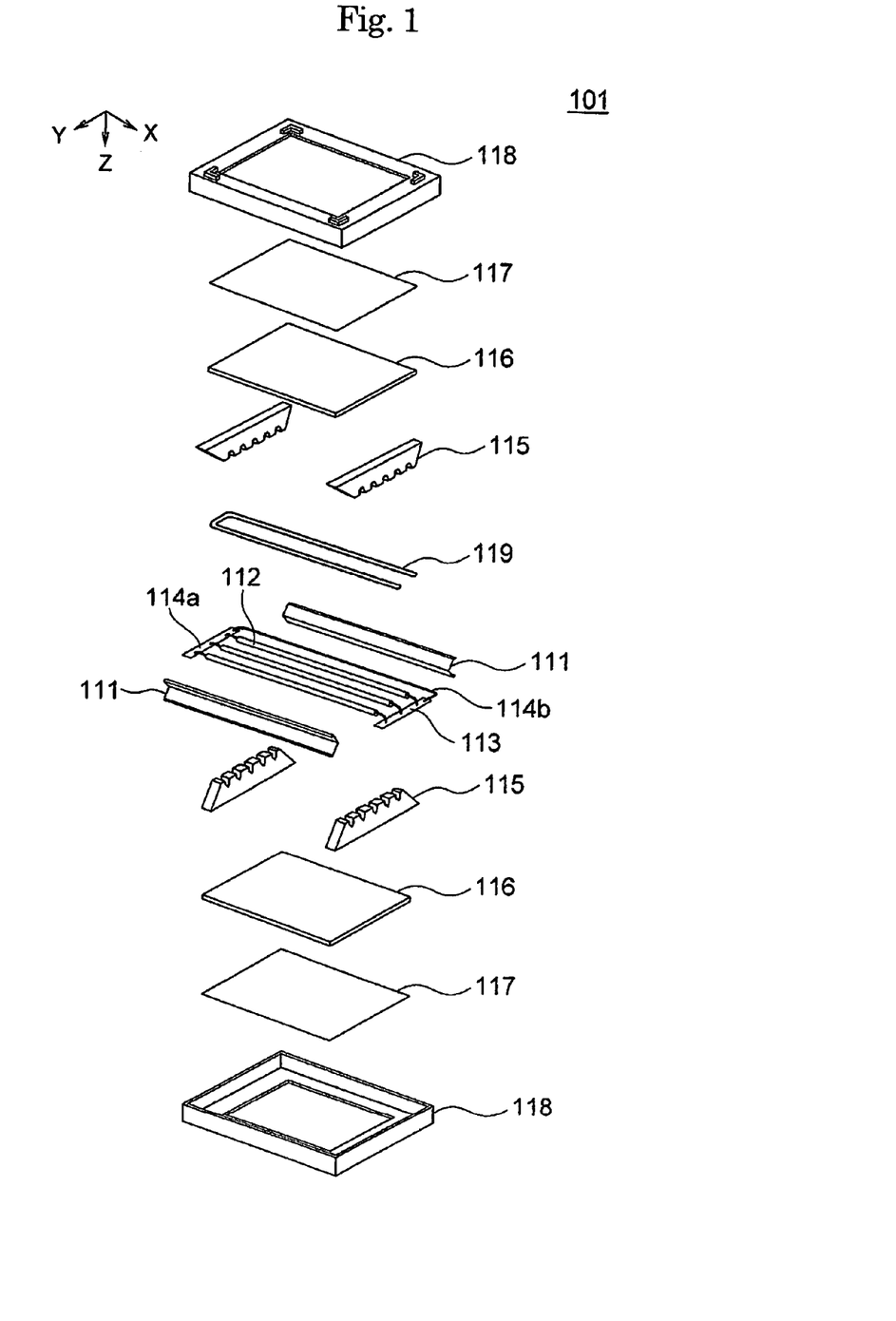
FIG. 1 is an exploded perspective view showing a backlight unit according to a first embodiment of the present invention.
Figure 2:
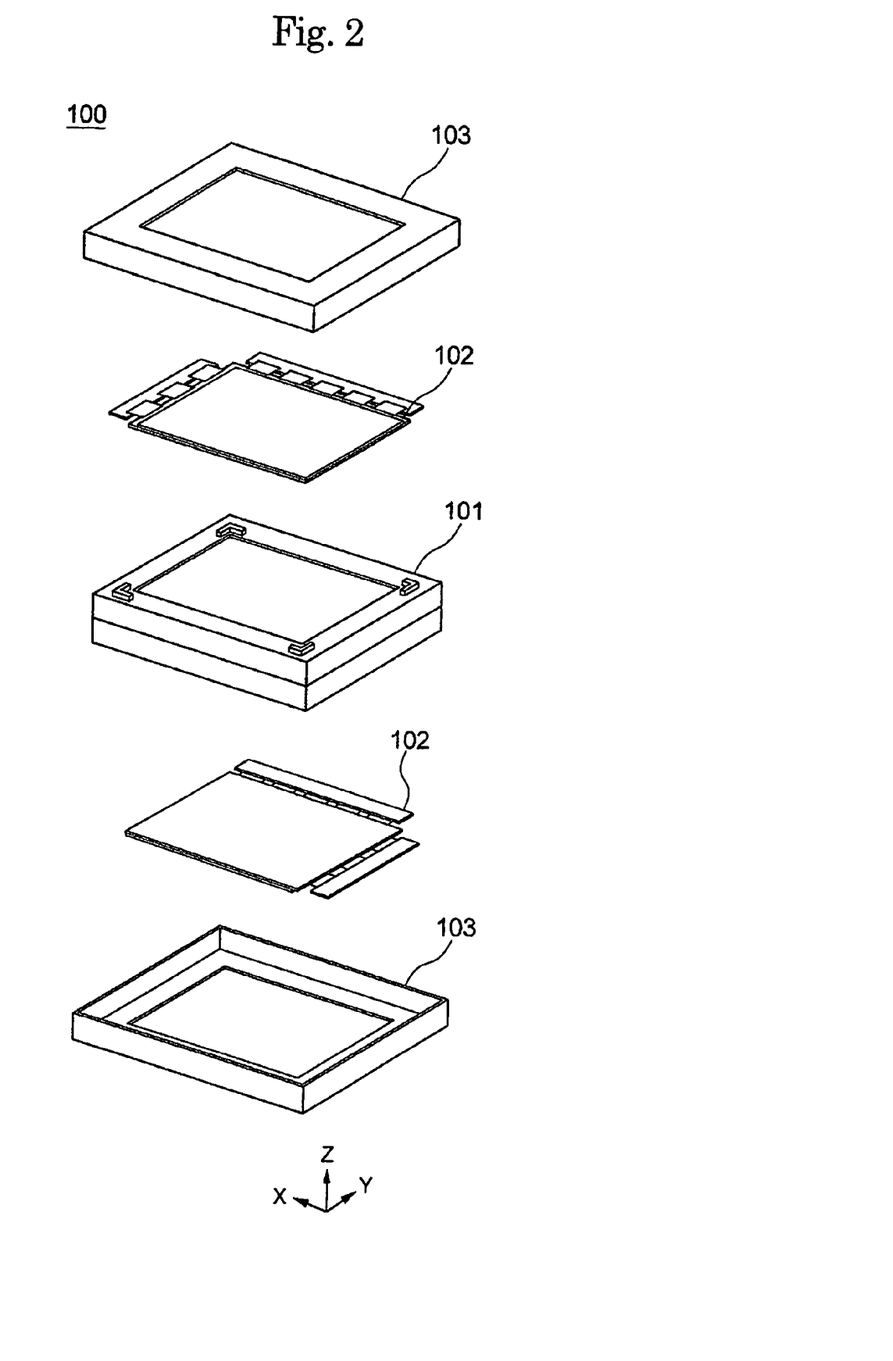
FIG. 2 is an exploded perspective view illustrating the structure of a LCD device that includes the backlight unit shown in FIG. 1.

FIG. 1 is an exploded perspective view showing a double-surface backlight unit 101 according to a first embodiment of the present invention. The double-surface backlight unit 101 includes a front part and a rear part, which are symmetrical with respect to lamps 112. Each of the front and rear parts has a lamp-supporting base 115, a diffusion plate 116, an optical sheet 117, and a backlight chassis 118. The double-surface backlight unit 101 differs from the conventional double-surface backlight unit 201a (FIG. 19) in that it has a heat-radiation member 119. The heat-radiation member 119 is used as a cooling device. FIG. 2 is an exploded perspective view of a LCD device 100 that includes the double-surface backlight unit 101. The LCD device 100 has a pair of liquid crystal panels 102 and a pair of front shields 103, in addition to the double-surface backlight unit 101. In the front and rear parts of the backlight unit 101, the front shield 103 holds the liquid crystal panel 102.

As shown FIG. 1, the lamps 112 are used as a light source of the backlight unit 101. The lamps 112 are connected at one of the terminals to an inverter 113, which applies an AC voltage of about 1000 V to 1600 V, generally known as lighting initiation voltage, to the lamps 112. The lamps 112 are connected at the other terminal to the ground by a return substrate 114a and a return cable 114b. The diffusion plates 116 define the light-emitting surfaces of the backlight unit 101. The diffusion plates 116 allow the light emitted from the lamps 112 somewhat uniform in intensity and then output the light. The optical sheets 117 are configured by a diffusion sheet, a lens sheet, a reflecting polarized film, or the like. These members also allow the light provided from the light-emitting surfaces (i.e., diffusion plates 116) more uniform and output the light.

Figure 3:
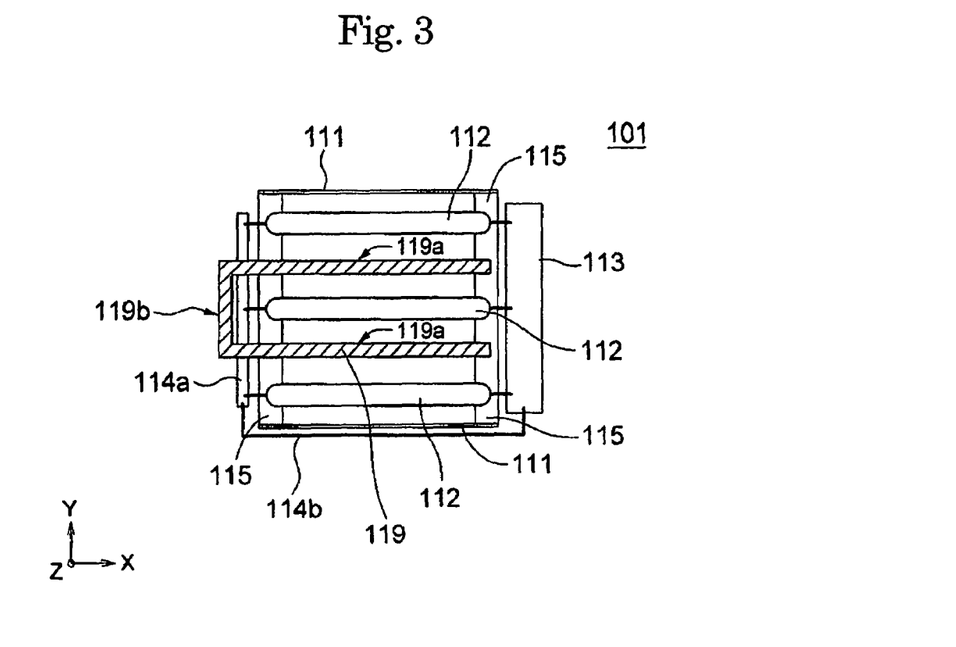
FIG. 3 is a top plan view of the backlight unit shown in FIG. 1, as observed in the Z-axis direction.

FIG. 3 is a top plan view of the backlight unit 101 shown if FIG. 1, as observed in the Z-axis direction. In FIG. 3, the diffusion plates 116, optical sheets 117 and backlight chassises 118 are not illustrated. The heat-radiation member 119 is made of a material that has a superior thermal conductivity. The heat-radiation member 119 may be made of a metal such as copper. It may be a pipe (tubular member) that is filled with liquid for conducting heat. Alternatively, it may be a heat pipe that is a sealed vessel vacuum-filled with a small amount of liquid and having a capillary structure on the inner wall. The heat-radiation member 119 is supported by the lamp-supporting bases 115, together with the lamps 112.

The heat-radiation member 119 has two rod-shaped parts 119a. The rod-shaped parts 119a extend substantially parallel to the lamps 112. Each rod-shaped part 119a extends between two adjacent lamps 112. An optical film is wrapped around each rod-shaped part 119a. The surface of each rod-shaped part 119a can therefore scatter or reflect light. Instead, optical coating may be applied to each rod-shaped part 119a. In either case, the shadow of the heat-radiation member 119 does not appear on either diffusion plate 116. Each rod-shaped part 119a extends in the X-axis direction, with one end thereof protruding outside the lamp-supporting base 115. The rod-shaped parts 119a are connected to each other by a coupling member 119b, outside the lamp-supporting base 115.

In the first embodiment, the rod-shaped parts 119a of the heat-radiation member 119 absorbs the heat generated from the lamps 112. The heat is therefore conducted to the coupling member 119b provided outside the lamp housing that is defined by the lamp-supporting bases 115, reflecting plates 111, and the front and rear diffusion plates 116, and radiated outside the lamp housing through the coupling member 119b which functions as a heat-radiating part. Accordingly, in the double-surface backlight unit 100, of which the heat tends to be stuffed in the lamp housing, the temperature in the lamp housing can be prevented from rising. Thus, the temperature in the lamp housing can remain within a range over which the lamps 112 have a high luminescence efficiency. This helps to enhance the luminance at the light-emitting surfaces of the backlight unit 101. This can also reduce the heat conducted to the liquid crystal panels 102 that are mounted on the diffusion plates 116. The LCD device 100 that has the backlight unit 101 can therefore display high-quality images.

If the reflecting plate has ventilation holes for radiating heat as is described in Publication No. 2002-196326, dust or foreign matter may enter the lamp housing through the holes. The first embodiment can radiate the heat from the lamp housing, without the necessity of forming ventilation holes in the reflecting plate. Thus, neither the dust nor foreign matter enters the lamp housing. Hence, the backlight unit 101 does not degrade the images that the LCD device 100 displays. If a heat-radiating body that contacts the reflecting plate and lamps is provided as described in Publication No. 2003-84280, the temperature of the lamps may be excessively lower, if the ambient temperature is relatively low. In the first embodiment, the lamps 112 will not be excessively cooled even if the ambient temperature is low. This is because the heat-radiation member 119 is not disposed in contact with the lamps 112.

As described before, a stripe member having a relatively higher thermal conductivity is provided between the diffusion plate and the lamps in the technique described in Publication No. 8-29785. The stripe member inevitably lowers the luminance at the light-emitting surface of the backlight unit. In the first embodiment, the lamp-supporting bases 115 support the lamps 112, as well as the heat-radiation member 119 that extends parallel to the lamps 112 and alternately therewith. In addition, the rod-shaped parts 119a of the heat-radiation member 119 are surface-treated to reflect or scatter the light from the lamps 112. Therefore, the luminance at the light-emitting surfaces of the backlight unit 101 does not decrease. Rather, rod-shaped parts 119a increase the light irradiated onto the diffusion plates 116. This increases the luminance at both the light-emitting surfaces. Thus, the adverse effect that the heat-radiation member 119 imposes on the luminance uniformity at the light-emitting surfaces is small.

Figure 4:
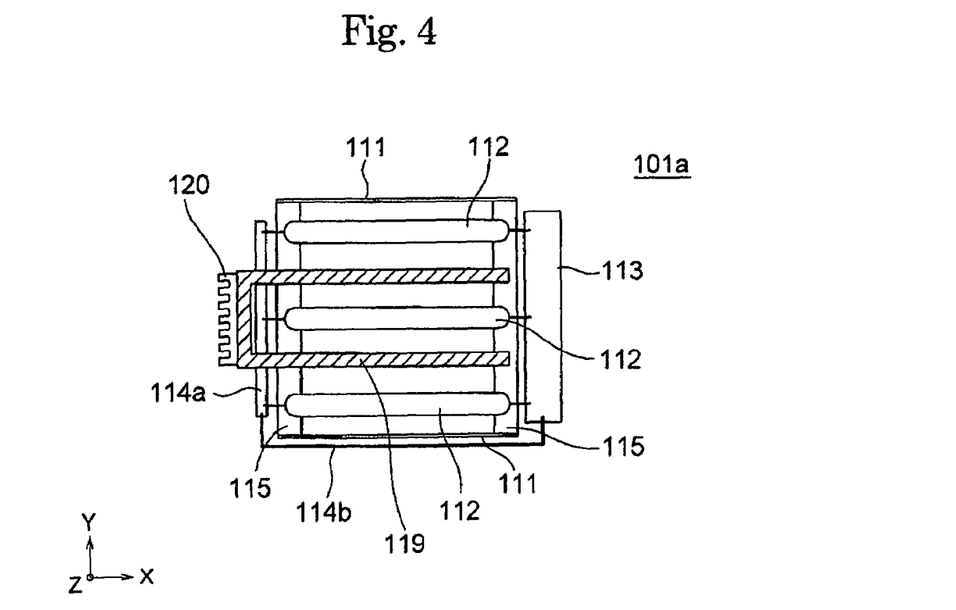
FIG. 4 is a top plan view depicting the structure of a backlight unit according to a second embodiment of the present invention.

FIG. 4 shows a backlight unit 101a according to a second embodiment of the present invention, in a top plan view thereof as viewed in the Z-axis direction similarly to FIG. 3 that illustrates the first embodiment. In the second embodiment, a heat sink 120 is secured to the coupling member 119b of the heat-radiation member 119 and located outside the lamp housing. The heat sink 120 is a heat-radiating member and made of a metal such as aluminum or copper. In the backlight unit 101a, heat is radiated from the lamp housing, mainly through the heat sink 120. Attached to the heat-radiation member 119, the heat sink 120 can enhance the heat-radiating efficiency of the heat-radiation member 119.

Figure 5:
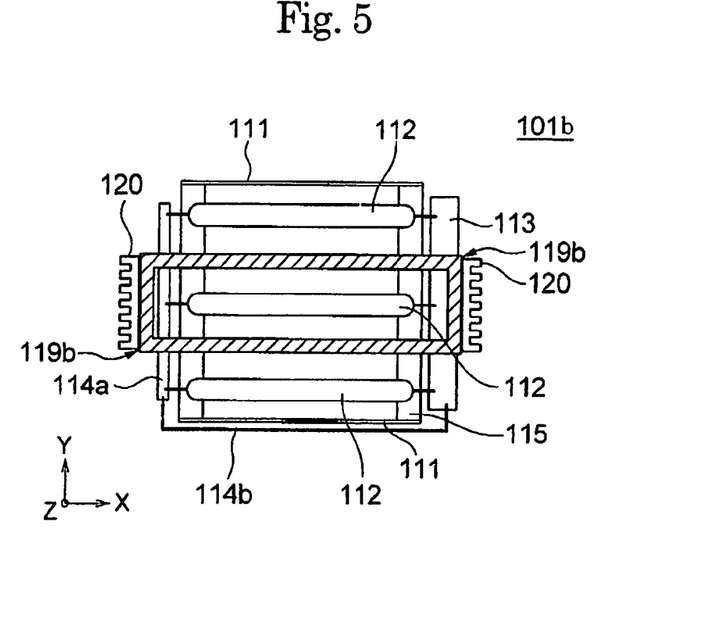
FIG. 5 is a top plan view showing the structure of a backlight unit according to a third embodiment of the present invention.

FIG. 5 is a top plan view showing a backlight unit 101b according to a third embodiment of the present invention, as viewed in the Z-axis direction. The third embodiment is similar to the second embodiment except that the heat-radiation member 119 is a ring shape or an endless member. The rod-shaped parts 119a of the heat-radiation member 119 are connected to one another at both ends thereof, by coupling members 119b that lie outside the lamp housing. The coupling members 119b are attached to heat sinks 120 at two ends of each rod-shaped part 119a in the X-axis direction. In the third embodiment, heat is radiated from the lamp housing through both ends of the heat-radiation member 119 as viewed in the X-axis direction. Hence, the heat-radiating efficiency is higher than in the second embodiment.

Figure 6:
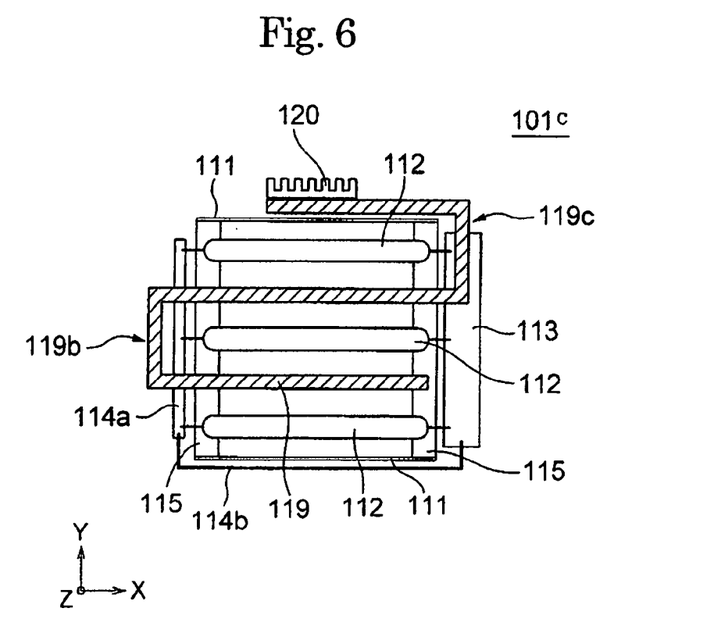
FIG. 6 is a top plan view showing the structure of a backlight unit according to a fourth embodiment of the present invention.

FIG. 6 is a top plan view showing a backlight unit 101c according to a fourth embodiment of the present invention, in a top plan view thereof as viewed in the Z-axis direction. The fourth embodiment is similar to the second embodiment except that the heat sink 120 is arranged at one end in the Y-axis direction. The heat-radiation member 119 has a bent part 119c, in addition to rod-shaped parts 119a and a coupling member 119b. The free end of the bent part 119c is coupled to a heat sink 120. Thus, the heat-radiation member 119 is meandering in a plane, as viewed in the Z-axis direction. In the fourth embodiment thus configured, heat can be radiated from the lamp housing in the Y-axis direction. Since the bent part 119c of the heat-radiation member 119 extends in the Y-axis direction and is spaced apart from the coupling member 119b in the X-axis direction, the heat is dissipated more efficiently than in the case where the bent part 119c extends in the Y-axis direction on the same side as the coupling member 119b.

Figure 7:
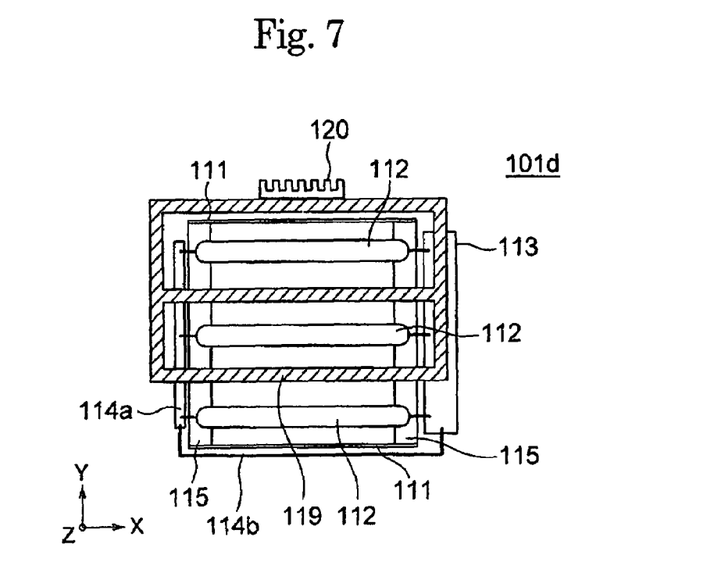
FIG. 7 is a top plan view illustrating the structure of a backlight unit according to a fifth embodiment of the present invention.

FIG. 7 is a top plan view showing a backlight unit 101d according to a fifth embodiment of the present invention, in a top plan view thereof as viewed in the Z-axis direction. The fifth embodiment is similar to the third embodiment except for two points. First, the ring-shaped heat-radiation member 119 protrudes from the lamp housing. Second, the heat sink 120 is arranged at one end of the unit 101d in the Y-axis direction. The fifth embodiment achieves advantages similar to those of the fourth embodiment.

Figure 8:
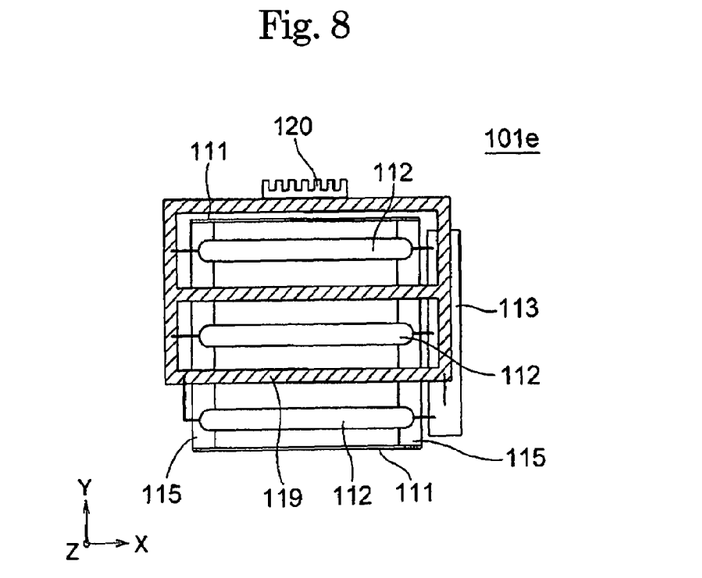
FIG. 8 is a top plan view depicting the structure of a backlight unit according to a sixth embodiment of the present invention.

FIG. 8 is a top plan view showing a backlight unit 101e according to a sixth embodiment of the present invention, as viewed in the Z-axis direction. The sixth embodiment is similar to the fifth embodiment except that the heat-radiation member 119 serves as a return substrate 114*a* and a return cable 114*b* for a power source. In the sixth embodiment the heat-radiation member 119 is made of electrically conductive material. The lamps 112 are connected at one of the terminals to an inverter 113, and at the other terminal to the ground through the heat-radiation member 119. Therefore, neither a return substrate 114*a* nor a return cable 114*b* needs to be provided for the power source. In other words, the six embodiment is advantageous in that the number of components can be reduced.

Figure 9:
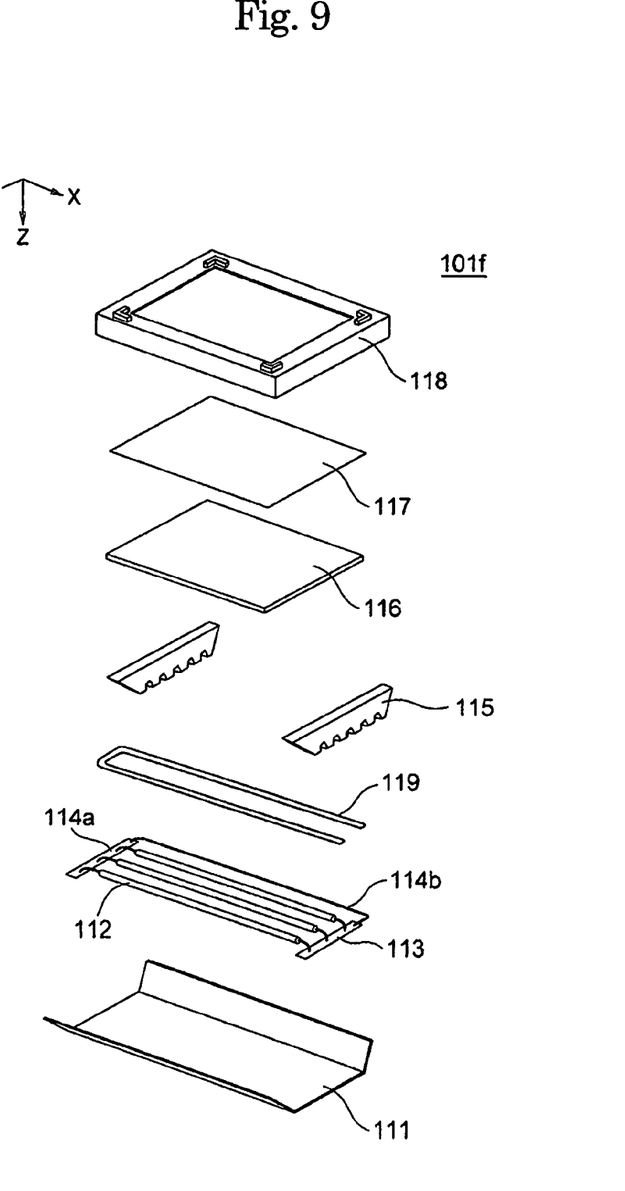
FIG. 9 is an exploded perspective view showing the structure of a backlight unit according to a seventh embodiment of the present invention.

FIG. 9 is an exploded perspective view showing a backlight unit 101*f* according to a seventh embodiment of the present invention. The seventh embodiment is similar to the first embodiment except that it is a one-side backlight unit that emits light from a single light-emitting surface. The structure shown in the Z-axis direction is similar to that of the first embodiment shown in FIG. 3. In the seventh embodiment, the heat from the lamps 112 is absorbed mainly in the heat-radiation member 119 and is then radiated from the lamp housing. Thus, in the backlight unit 101*f*, the heat is radiated from the reflecting plate 111 opposing the diffusion plate 116 and optical sheet 117 in a smaller amount than in the case where the heat-radiation member 119 is not provided.

In most LCD devices having a one-side backlight unit, the X-direction drive circuit 204 and Y-direction drive circuit 205 are arranged at the rear side of the reflecting plate 111, as is illustrated in FIG. 18. In the seventh embodiment i.e., backlight unit 101*f*, the heat radiated from the reflecting plate 111 can be reduced. Thus, the LCD device that incorporates therein the backlight unit 101*f* does not involve a problem in that the X-direction drive circuit 204 and Y-direction drive circuit 205 are heated. In addition, since the heat radiated from the optical sheet 117 is also reduced, a malfunction involved with the heating of the liquid crystal panel 202 can be avoided.

Figure 10:
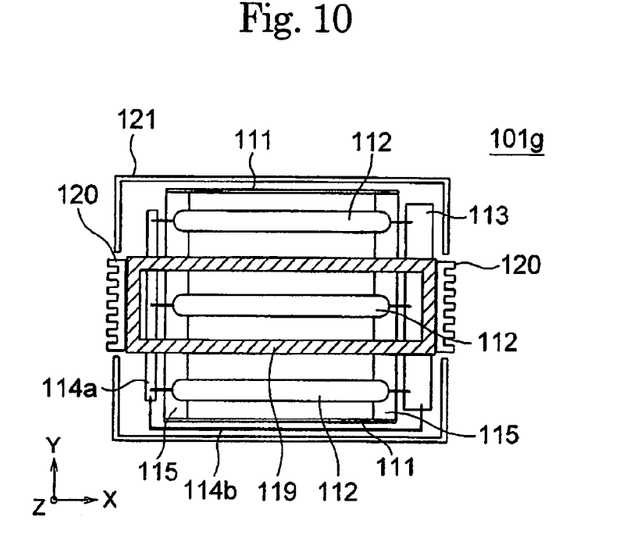
FIG. 10 is a top plan view of a backlight unit having a heat sink that is exposed outside the housing.

The heat radiated from the lamp housing via the heat-radiation member 119 can be released into the atmosphere, as will be described hereinafter. In the case of the backlight unit that has the structure of FIG. 5, the heat sinks 120 provided at both the ends of the heat-radiation member 119 in the X-axis direction are exposed outside the backlight chassis 118 or housing 121 of the LCD device as is illustrated in FIG. 10. The housing 121 may be defined by a shield front 203 (FIG. 16) of the LCD device. In this configuration, the heat sink 120 is exposed to the atmosphere, and the heat in the lamp housing can be radiated from the backlight unit 101*g*.

Figure 11:
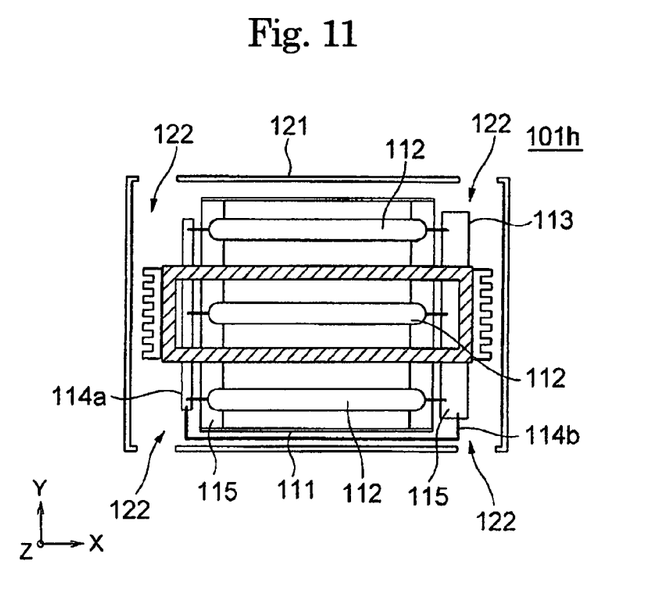
FIG. 11 is a top plan view of a backlight unit whose housing has ventilation holes.
Figure 12:
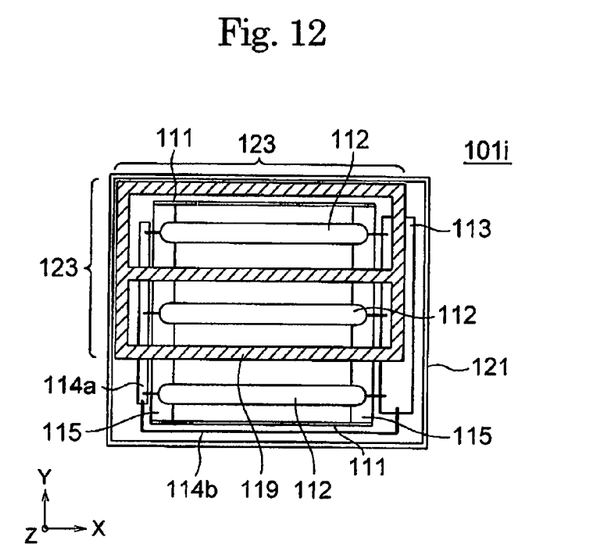
FIG. 12 is a top plan view of a backlight unit that radiates heat through the housing.

Alternatively, the housing 121 of the LCD device may have ventilation holes 122 as shown in FIG. 11. Then, the air entering through the ventilation holes 122 can be applied to the heat sink 120. If the backlight unit has the structure of FIG. 7 and does not have the heat sink 120, a contact surface 123 may be provided between the housing 121 of the LCD device and the heat-radiation member 119 as is illustrated in FIG. 12. Heat can then be radiated from the lamp housing into the atmosphere through the contacting surface 123. In this case, it is desired that the housing 121 be made of a material having a higher thermal conductivity, such as aluminum, SUS, iron or copper. Having no heat sinks 120, the backlight unit may be composed of fewer parts than otherwise.

Figure 13:
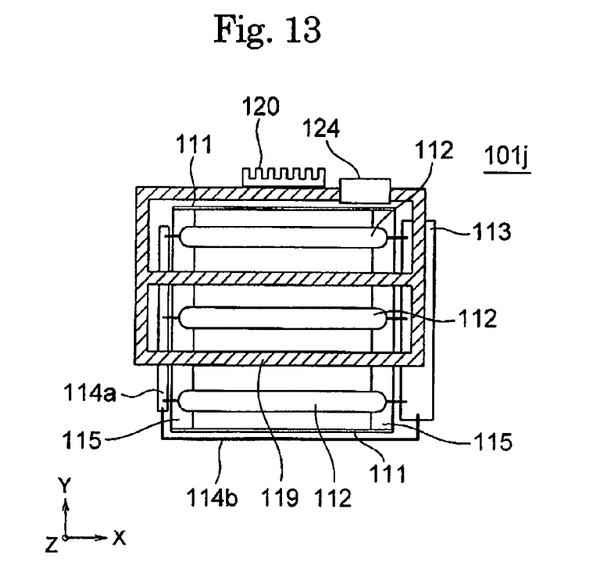
FIG. 13 is a top plan view of a backlight unit that has a heat-absorbing member filled with liquid.

FIG. 13 is a top plan view of a backlight unit 101*j*, as observed in the Z-axis direction. The heat-radiation member 119 of the backlight unit 101*j* is of a ring shape and filled with liquid. As shown in FIG. 13, a device for circulating the liquid, such as a pump 124, is provided on an appropriate portion of the heat-radiation member 119. Thus, the liquid is forced to circulate in the heat-radiation member 119. The heat in the lamp housing can therefore be conducted to the heat sink at a higher efficiency.

Figure 14:
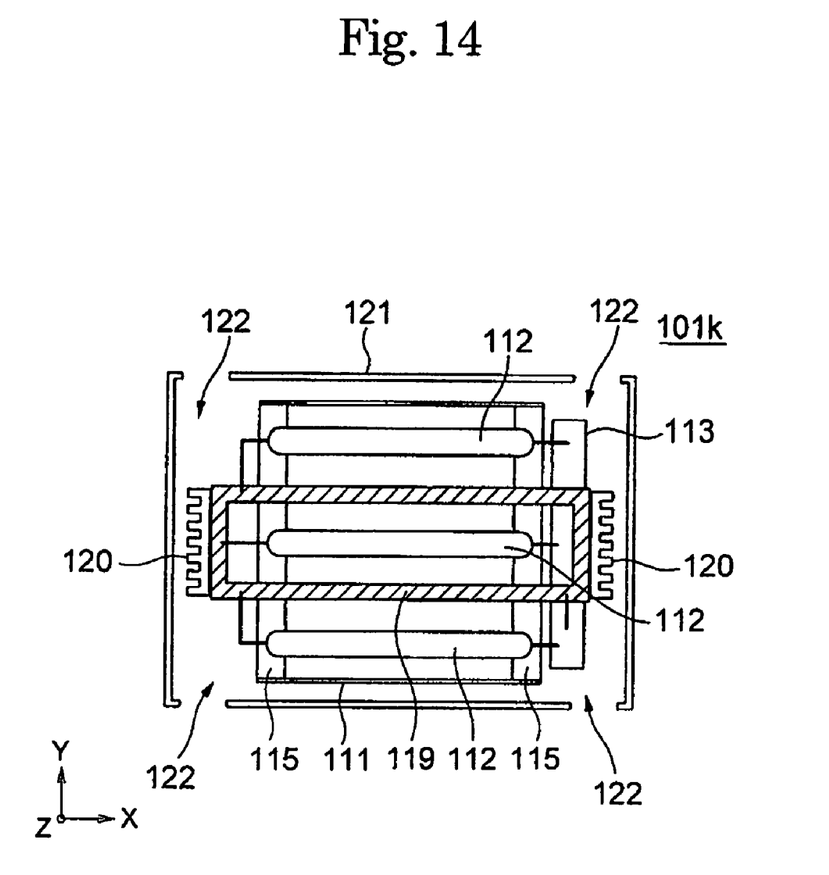
FIG. 14 is a top plan view of a backlight unit the housing of which has ventilation holes and which has no return substrate.

The embodiments described above may be combined in various ways. For instance, the one-side backlight unit, i.e., the seventh embodiment, may include a heat-radiation member 119 having a structure similar to those in the first to sixth embodiments. Further, the third embodiment and the sixth embodiment may be combined to provide a backlight unit shown in FIG. 14, in which air enters through ventilation holes 122 and is applied to the heat sinks 120. It is to be noted that the backlight unit is not limited to such a backlight unit for use in a LCD device, and may be used as a lighting apparatus in an advertising board, for example.

What is claimed is:

1. A backlight unit comprising:
a lamp housing having a light transmittance plate at a front surface of said lamp housing:
at least one lamp received in said lamp housing for emitting light through said light transmittance plate toward outside said lamp housing:
a cooling member having a heat-absorbing part received in said lamp housing and a heat-radiating part extending from said heat-absorbing part to outside said lamp housing for radiating heat absorbed by said heat-absorbing part to outside said lamp housing, wherein both said heat-absorbing part and said heat-radiating part are configured as a tube that receives liquid therein; and
a liquid crystal panel mounted on said backlight unit in a vicinity of said light transmittance plate.

2. The backlight unit according to claim 1, wherein said heat-absorbing part is a rod-shaped member or a tubular member extending parallel to said lamp.

3. The backlight unit according to claim 2, wherein said heat-absorbing part has a light reflecting surface for reflecting light from said lamp toward said light transmittance plate.

4. The backlight unit according to claim 2, wherein said heat-radiating part includes a heat sink.

5. The backlight unit according to claim 1, wherein said at least one lamp includes a plurality of elongate lamps supported by a support member, and said heat-absorbing part includes a plurality of elongate heat-absorbing portions supported by said support member and arranged alternately with said plurality of elongate lamps.

6. The backlight unit according to claim 5, wherein said heat-radiating part couples together said plurality of elongate heat-absorbing portions at respective both ends of said elongate heat-absorbing portions.

7. The backlight unit according to claim 5, wherein said heat-radiating part couples together said plurality of elongate heat-absorbing portions at respective one ends of said elongate heat-absorbing portions.

8. The backlight unit according to claim 1, wherein said heat-absorbing part is electric-conductive, and has a first end connected to an inverter and a second end connected to ground via said heat-radiating part.

9. The backlight unit according to claim 1, wherein said backlight unit is a double-sided backlight unit, and said lamp housing includes a pair of said light transmittance plate opposing each other.

10. The LCD device according to claim 1, wherein said heat-radiating part is disposed outside a housing of said LCD device.

11. The LCD device according to claim 1, wherein said heat-radiating part is disposed inside a housing of said LCD device, and said housing of said LCD device has a ventilation hole.

12. A backlight unit comprising:
- a lamp housing having a light transmittance plate at a front surface of said lamp housing;
- at least one lamp received in said lamp housing for emitting light through said light transmittance plate toward outside said lamp housing; and
- a cooling member having a heat-absorbing part received in said lamp housing and a heat-radiating part extending from said heat-absorbing part to outside said lamp housing for radiating heat absorbed by said heat-absorbing part to outside said lamp housing, wherein said heat-absorbing part is electric-conductive, and has a first end connected to an inverter and a second end connected to ground via said heat-radiating part.

13. The backlight unit according to claim 12, wherein said heat-absorbing part is a rod-shaped member or a tubular member extending parallel to said lamp.

14. The backlight unit according to claim 12, wherein said heat-absorbing part has a light reflecting surface for reflecting light from said lamp toward said light transmittance plate.

15. The backlight unit according to claim 12, wherein said heat-radiating part includes a heat sink.

16. The backlight unit according to claim 12, wherein both said heat-absorbing part and said heat-radiating part further comprise a tube that receives liquid therein.

17. The backlight unit according to claim 12, wherein said at least one lamp includes a plurality of elongate lamps supported by a support member, and said heat-absorbing part includes a plurality of elongate heat-absorbing portions supported by said support member and arranged alternately with said plurality of elongate lamps.

18. The backlight unit according to claim 17, wherein said heat-radiating part couples together said plurality of elongate heat-absorbing portions at respective both ends of said elongate heat-absorbing portions.

19. The backlight unit according to claim 12, wherein said backlight unit is a double-sided backlight unit, and said lamp housing includes a pair of said light transmittance plate opposing each other.

20. A liquid crystal display (LCD) device comprising the backlight unit according to claim 12, and a liquid crystal panel mounted on said backlight unit in a vicinity of said light transmittance plate.

21. The LCD device according to claim 20, wherein said heat-radiating part is disposed outside a housing of said LCD device.

22. The LCD device according to claim 20, wherein said heat-radiating part is disposed inside a housing of said LCD device, and said housing of said LCD device has a ventilation hole.

* * * * *